Jan. 1, 1952  A. EDELMAN  2,581,085
LIQUID LEVEL GAUGE
Filed Feb. 1, 1945
2 SHEETS—SHEET 1

INVENTOR.
ABRAHAM EDELMAN
BY
ATTORNEY

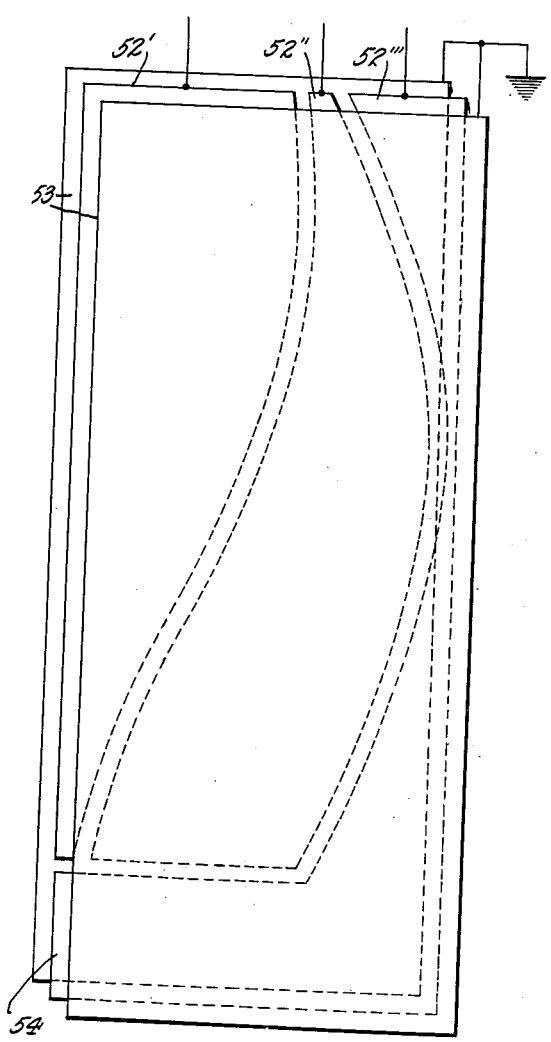
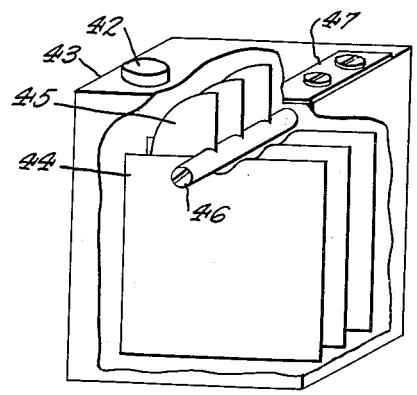
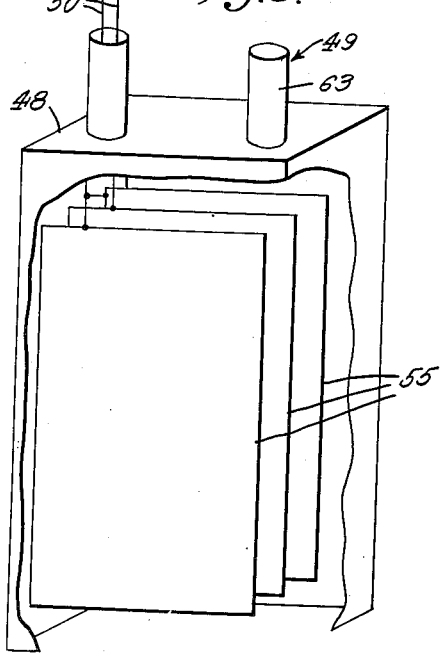
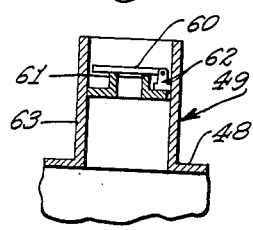

Patented Jan. 1, 1952

2,581,085

UNITED STATES PATENT OFFICE 2,581,085

LIQUID LEVEL GAUGE

Abraham Edelman, New York, N. Y., assignor to The Liquidometer Corporation, Long Island City, N. Y., a corporation of Delaware Application February 1, 1945, Serial No. 575,664

16 Claims. (Cl. 73—304)

The invention relates to improvements in indicating and signaling devices for the displacements of two relatively movable, electrically coacting media including solids and fluids in various combinations, particularly to improvements in telemetering devices in which the indications of the measuring device are controlled by the capacitance between the electrodes of a transmitter capacitor.

Telemetering devices of the type described may be used to measure the changes of the fluid contents of a container. The fluid to be measured, for example a liquid, will occupy more or less of the electric field space between the electrodes according to the amount of liquid present. If now the medium displaced by the liquid has a dielectric constant which is different from that of the liquid to be measured, the capacitance between the electrodes will vary with the level or amount of liquid to be measured. Usually air is used as the medium to be displaced by the liquid to be measured, air having a dielectric constant different from that of all liquids.

With devices of this type there is the difficulty that the capacitance between the electrodes will be controlled not only by variations of the level or volume of the liquid but also by changes of the dielectric constant of the liquid. As is well known, the dielectric constant of a liquid or any other fluid is affected by various causes such as temperature, chemical changes, for example changes of the dilution or concentration of the liquid. If now the liquid in the electric field space between the electrodes is exposed to such variations the dielectric constant of the liquid will change, causing a corresponding change of the total capacitance of the capacitor and hence affecting the indications of the telemetering device.

It will be apparent from the previous explanation that variations of the dielectric constant will affect indications of the telemetering device in response to changes of the level or volume of the fluid so that such indications will not represent the correct value of the measured changes.

One of the objects of the invention is to provide means for eliminating any errors caused by variations of the dielectric constant of the fluid to be measured in the measuring of the level or volume of the fluid.

Another object of the invention is to provide means for measuring accurately the level or contents of a fluid in a container independently of the dielectric constant of the fluid to be measured and any variation thereof.

Another object of the invention is to provide means for eliminating all errors in the indications caused by variations of the dielectric constant of the fluid to be measured without requiring any moving parts in the container, and means permitting remote electrical indications and capable of totalizing the contents of several containers on one indicator.

Other and further objects, features and advantages of the invention will appear hereinafter and will be specifically pointed out in the appended claims.

It should be noted that the term and expression "fluid" as herein used shall and does include conducting and non-conducting liquids such as gasoline, gases, and powdered or granulated conducting or non-conducting materials, etc.

It should further be noted that the invention is applicable to all types of devices in which a portion of the dielectric is air subject to variations in dielectric constant due to changes of temperature, humidity, pressure, etc.

To illustrate the principles of the present invention in application to liquids, let there be two similar parallel flat plates of metal, forming a condenser, placed within a tank, so that a liquid in the tank may rise between the plates and displace the air. The dielectric constant of air is 1.0; and let $K_L$ designate the dielectric constant of the liquid. All known liquids have a value of $K_L$ greater than 1.0. The capacitance of the condenser with air between the plates may now be designated as $C_E$; with liquid between the plates, as $C_F$; with part liquid and part air, as $C_H$, so that $C_H$ varies from a minimum value of $C_E$ to a maximum value of $C_F$ as the electric field space between the metal plates is varied from empty to full of the liquid in the tank. The plates are assumed to be rather close together, so that the formula for the capacitance of a parallel plate condenser may apply. This formula is $C=KA/bd$, in which $C$ is the capacitance, $K$ the dielectric constant, $A$ the area, $b$ a constant, and $d$ the spacing between the plates.

The capacitance $C_H$ may be considered as consisting of two condensers in parallel, one having a dielectric $K_L$ and an area $A_L$, and the other having a dielectric 1.0, and an area $A-A_L$. That is, $$C_H = K_L A_L/bd + (A-A_L)/bd = (K_L-1) A_L/bd + C_E$$

If now a circuit system is provided for the condenser which furnishes a current proportional to $(C_H-C_E)$, such current, as the above formula shows, must also be proportional to $(K_L-1)$. In similar manner, a second circuit system is provided for a second immersed condenser, so that a second current is obtained proportional to $(K_L-1)$. The two currents may then be applied to the coils of a ratiometer, which has the property of being insensitive to changes in coil currents when they vary in proportion to a common factor. As a result, the ratiometer will furnish an indication which is not at all dependent on $(K_L-1)$ and is, therefore, also independent of $K_L$.

There are numerous bridge type circuits which balance one condenser against another, thus providing a current which is proportional to the difference between two capacitances. There are also other circuits which balance out part of a capacitative impedance by employing inductors.

The present application is related in subject matter to the copending application of Sontheimer, Serial Number 141,452, filed January 31, 1950, entitled "Measuring System with Compensation for Dielectric Constant," which application is owned in common with the present application. These two applications have priority in the order of their respective filing dates; in other words, the present application is to carry all claims generic to the two applications, while the Sontheimer application is to be restricted to subject matter disclosed therein and not disclosed in the present application. The lines of division between these two cases are based upon these principles.

In the accompanying drawings several embodiments of the invention are shown by way of illustration and not by way of limitation.

In the drawings:

Fig. 4 is a diagrammatic perspective view of a condenser assembly to be used in connection with circuit arrangements according to the invention;

Fig. 5 is a diagrammatic perspective view, partially broken away, of a modification of a condenser assembly to be used with circuit arrangements according to the invention;

Fig. 6 is a similar view of still another modification of a condenser assembly to be used in circuit arrangements according to the invention, and Fig. 7 is a detail, on an enlarged scale, of a check valve shown in Fig. 6.

Figure 1:
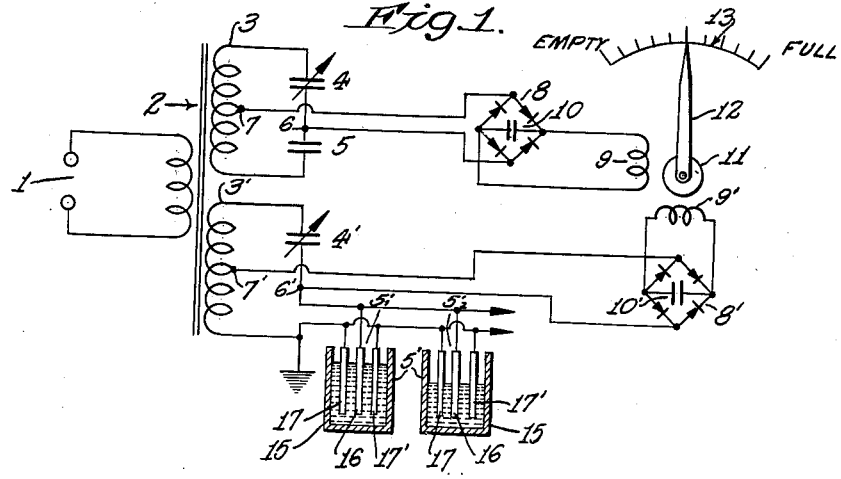
Fig. 1 shows a diagrammatic circuit arrangement according to the invention providing a current which is proportional to the differences between two capacitances.

Referring to Fig. 1, 1 is a source of A.-C., 2 is an input transformer having two similar center-tapped secondaries 3 and 3'. Bridged across the outer terminals of secondary 3 are two condensers 4 and 5 connected in series. Bridged across the two outer terminals of secondary 3' are two other condensers 4' and 5', condensers 4 and 4' being variable condensers. Condenser 5' comprises several condenser units 5'₁, 5'₂, etc. all in parallel, and each immersed more or less in liquid within tanks 15. Each condenser unit comprises an electrode 16 and a second electrode composed of two sections 17, 17'.

In such circuit system the current in the branch between junctions 6 and 7 will be proportional to the difference between capacitance 4 and capacitance 5; and similarly, the current in the branch between junctions 6' and 7' will be proportional to the difference between capacitances 4' and 5'. These two currents which are, of course, A.-C. currents are passed through rectifiers 8 and 8', and then used to energize coils 9 and 9' of a ratiometer with D.-C. current, which may be filtered by means of filter condensers 10 and 10'. The D.-C. currents will be approximately proportional to the A.-C. currents from which they are derived, and therefore will also be proportional to the capacitance differences.

The ratiometer comprises a permanent-magnet rotor 11 which supports a pointer 12 coacting with a dial 13 calibrated, for example, in units of liquid volume.

Condensers 5 and 5' include as dielectric a liquid having the same dielectric constant $K_L$ (the dielectric constant of the liquid being gauged) while condensers 4 and 4' may have any dielectric independent of the particular liquid being gauged. The values of capacitance of condensers 4 and 4' are adjusted in advance to be equal to the values of capacitance in condensers 5 and 5' when the latter have air as dielectric. With such an adjustment, no current will flow in the branches 6—7 and 6'—7', and the ratiometer pointer 12 is uncontrolled. However, this condition does not occur in practice, ever, this condition does not occur in practice. Condenser 5 always contains liquid as dielectric and after condenser 4 has been adjusted there is always a difference in capacitance between condensers 4 and 5. In practice, when all the units of condenser 5' are empty of liquid, no current flows in the ratiometer coil 9', and the permanent-magnet rotor 11 of the ratiometer is controlled only by coil 9. The result of this is to rotate the rotor 11 and pointer 12 so that the dial indication is at "Empty." If liquid enters any or all of the units of condenser 5', the total capacitance of condenser 5' is increased, and current flows through the coil 9' in proportion to the capacitance difference between condenser 5' and 4'. The ratiometer pointer movement is then determined by both coils 9 and 9'. When the liquid fully occupies the dielectric space in the units of condenser 5', and the current in coil 9' is at its maximum value, the pointer 12 will indicate some other position on the dial 13, which may be marked "Full."

If the liquid in both condensers 5 and 5' now be replaced with some other liquid having another dielectric constant, then the same indications for "Empty," "Full," and for intermediate positions will result, since the currents in the coils 9 and 9' will bear the same ratio to each other as before, differing from their previous values only by the common factor due to the changed dielectric constant.

Figures 2, 3:
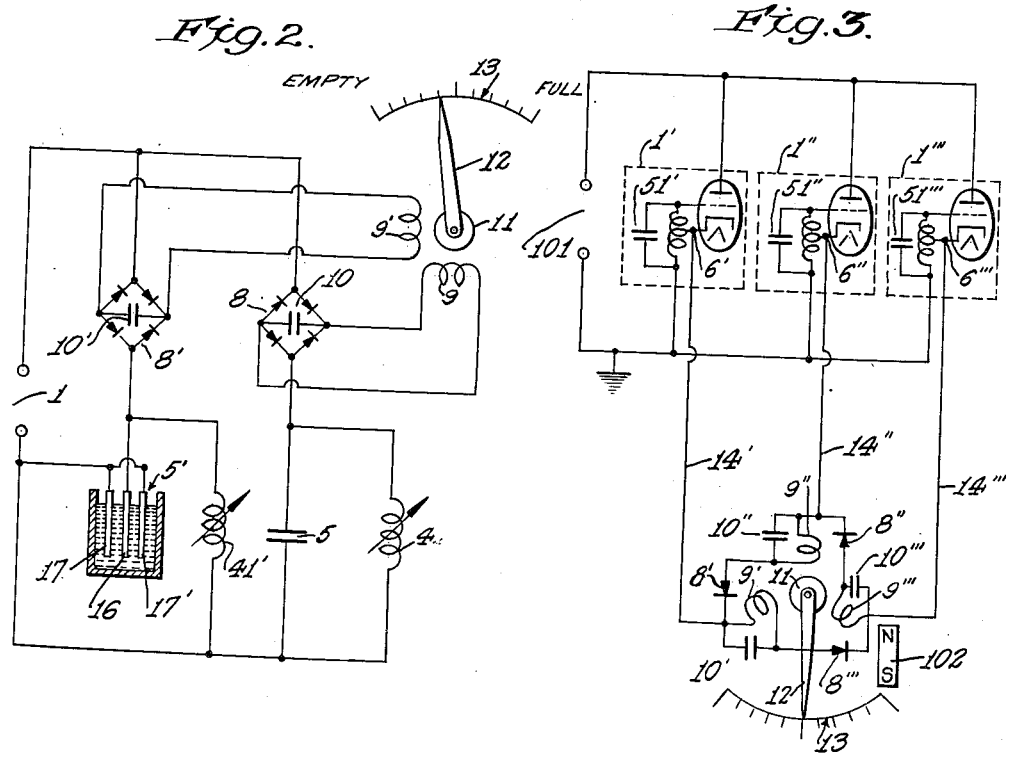
Fig. 2 is a diagrammatic circuit arrangement according to the invention employing inductors for balancing out part of a capacitive impedance.
Fig. 3 is a circuit arrangement similar to Fig. 1 in which oscillators are used.

In the circuit arrangement shown in Fig. 2 the source 1 of A.-C. is employed directly, without interposing a transformer, condensers 5 and 5' are the same as in Fig. 1, but it should be understood that the condenser 5' may be constituted by several separate condenser units in parallel as before. Inductors 41 and 41' are used in place of the condensers 4 and 4' shown in Fig. 1. These inductors perform their functions by supplying to rectifiers 8 and 8' a current opposite in phase to that supplied by condensers 5 and 5'. Thus, the total current into rectifiers 8 and 8' is reduced in amplitude to any desired extent.

Inductors 41 and 41' are adjusted so that the current from condensers 5 and 5' is balanced out when air dielectric is used in them. A small residue of current may exist in rectifiers 8 and 8', but this has not been found to be important in obtaining reasonably accurate indications of liquid level.

The rectified current output from rectifiers 8 and 8' may be filtered by filter condensers 10 and 10', and is applied through ratiometer coils 9 and 9'.

As previously explained, for the condition in which no liquid is present in either condenser 5 or 5', no current exists in ratiometer coils 9 and 9', and the pointer position is indeterminate. However, as mentioned in connection with Fig. 1, in practice condenser 5 is always filled with liquid after inductor 41 has been properly adjusted. As a result, there is sufficient current in coil 9 to rotate the rotor 11 into a definite position, and cause pointer 12 to indicate "Empty" on dial 13. Furthermore, if condenser 5' is now assumed to be filled gradually with liquid, the current in coil 9' will increase gradually also, and this will rotate the pointer until it points to "Full" at the time the liquid has reached a desired level.

As will now be clear, a change in the dielectric constant of the liquid, as might occur if the level measuring equipment is employed from time to time for measuring different dilutions or different chemicals, will affect both coils proportionally, and so will not influence the position of the pointer on the dial.

Fig. 3 illustrates a third circuit arrangement in which the principles of the invention are applied. Three conventional-type electronic oscillators 1', 1'', 1''' are supplied from a source of D.-C. 101. Each oscillator includes in its resonating or tank circuit a condenser to ground such as 51', 51'', 51'''. All three of these condensers are placed in one tank or container and correspond to any one of the condenser units of Fig. 1 such as $5'_1$ or $5'_2$ and it will be understood that the natural or resonant frequency of each oscillator will vary with the capacitance value in each such condenser. However, the oscillators are coupled together through coupling circuits that include leads 14', 14'', 14''', rectifiers 8', 8'', 8''', and also ratiometer coils 9', 9'', 9''', to which filter condensers 10', 10'', 10''' are respectively connected in parallel. Because of this coupling, the oscillators are unable to operate at their resonant frequencies, but influence each other by supplying signals through the coupling circuits. The interaction between the oscillators is such as to cause them all to operate at one common frequency. The difference between this common frequency of oscillation, and the natural frequency at which each oscillator tends to operate causes the oscillators to be shifted in phase from each other in proportion to this difference. The phase differences between corresponding junctions 6', 6'', 6''' of the oscillator circuits then establish the magnitudes of the currents flowing through the coupling rectifiers and ratiometer coils.

It will now be obvious that in Fig. 3 each of the condensers 51', 51'', 51''' is compared with the other two, while in Fig. 1 condenser 5 is compared with the total capacitance of transmitter condenser 5', or in other words, both systems are based on the same principle of comparing capacitances.

The condensers 51', 51'', 51''' are preferably combined to a single assembly as shown in Fig. 4. The latter figure illustrates three plates 52', 52'', 52''', each being an ungrounded electrode of one of the condensers 51', 51'', 51'''. As shown in the figure, it is convenient to place these plates in one plane, and to have a rectangular outline for them as a group. Adjacent to the group of plates 52', 52'', 52''' and on both sides of it, are placed two grounded rectangular plates 53. Three parallel plate condensers are thus formed.

It has been found desirable to shape the outlines of plates 52', 52'', 52''' approximately as shown in Fig. 4. The outlines of the plates are shaped and selected in such a manner that the "Empty" capacitances of condensers 51', 51'', 51''' be all equal; and that as the liquid level changes, the capacitance differences 51'—51'', 51''—51''', 51'''—51' should all change continuously. The exact configuration of the plates can be conveniently ascertained by calculation and experiment.

Since the capacitances are all equal when air is the dielectric, there is no phase shift between the three oscillators, and no current flows in the coupling branches of the ratiometer coils, so that the pointer of the ratiometer will have no determinate position. To correct this situation a preferably rectangular addition or extension 54 is provided at the bottom of plate 52''', as shown in Fig. 4. That is, part of the area of plate 52''' has been placed below plates 52'' and 52'.

When the level of the liquid is below all the plates, the indicator pointer position is indeterminate, as far as the effect of the ratiometer coils is concerned. The pointer may however be caused to move into a definite "Empty" position by the use of a pointer control magnet 102 (Fig. 3), or any other suitable means.

As the liquid level rises and reaches extension 54 of plate 52''', but before it reaches plates 52' and 52'', the current in some of the ratiometer coils begins to flow in proportion, moving the pointer 12 from the "Empty" position. During this period of measurement, however, the indications of the ratiometer are dependent on changes in the supply voltage, and are not accurate. However, when the liquid level reaches plates 52' and 52'', the current created in the ratiometer coils is sufficient to furnish a rotor-controlling force in the ratiometer which is much greater than that produced by the pointer control magnet 102, so that the latter exerts an insignificant influence thereafter on the pointer position.

As the liquid level rises along the three plates, the ratiometer coil currents change continuously; and by suitably designing the shapes of the three plates in relation to each other, the pointer movement can be made approximately uniform with level change. Furthermore, the pointer travel can now be made to encompass 360° or even several revolutions.

It will be also apparent that during the entire measurement from the bottom of plates 52' and 52'' to "Full," the conditions required for elimination of error due to dielectric constant have been fulfilled, and that therefore the same level indications will result for wide variations in dielectric constant of the liquid. Furthermore, part 54 may be in the sump of the tank, so that a negligible volume is associated with the measurement of the inaccurate part of the range of measurement.

Fig. 5 shows a liquid-filled condenser suitable for use as condenser 5 in a circuit such as illustrated in Fig. 1. It includes a filling aperture 42, a liquid-proof container 43, stationary capacitance electrodes 44, adjustable capacitance electrodes 45, a shaft 46 for adjustment of electrodes 46, and terminals 47. The condenser may also be employed in the circuit of Fig. 3 in place of the rectangular portion 54 of plate 52''' which is below the level of the other two plates. If so employed, the ratiometer will never have zero current in all of its coils. The pointer control magnet 102 may be then dispensed with entirely and the measurement is independent of $K_L$ from "Empty" to "Full."

Fig. 6 shows another liquid-filled condenser suitable for use as condenser 5 or in place of portion 54 of plate 52'''. This condenser is designed for incorporation into the tank. It includes a container 48, open at the bottom and having an air-check valve 49 at the top, terminals 50 and electrodes 55 inside. Air-check valve 49, which may be of any suitable design, is shown in Fig. 7 as comprising a flap 60 and a valve seat 61 pivotally supporting the flap by means of a pivot 62. The valve seat may be mounted in a tubular member 63 fastened to container 48. When the tank is filled with liquid, the flap 60 of air-check valve 49 will be lifted by the pressure of the escaping air, thus permitting the container to fill up, and to remain full thereafter until the liquid level is below the bottom of the container, the flap being pressed against its seat by air pressure.

If the liquid level falls below the bottom of this container, it empties of liquid, and thereafter the measurement is inaccurate. However, it is often practical to bring the bottom of the container 48 down to nearly the bottom of the tank, so that the tank is known to be practically empty when the liquid-filled condenser empties. Furthermore, since this creates the previously-described condition in which no current flows in any of the ratiometer coils, it is possible to employ a pointer-control magnet such as 102 shown in Fig. 3, to bring the pointer to "Empty" or to an off-scale position.

It should be understood, that the invention is not limited to non-conducting liquids. It is equally practical to take measurements on conducting liquids, provided only that some of the electrodes are coated with an insulating coating, thereby preventing the passage of resistive components of current in parallel with capacitative components.

The invention is furthermore not limited to liquids, but may be used for the measurement of powdered and granular materials, and semi-liquids. Tanks in which the space above the liquid or material being gauged is occupied by air have been previously described; but it should be understood that various fluids other than air, such as liquids, may be displaced by the material to be measured, the principles disclosed will still apply without essential change.

The term "ratiometer" has been used in the foregoing to describe a form of indicating instrument in which the indication does not vary if the ratio between the currents supplied to it remains unchanged. The discussion should be understood to include all such instruments, including those which have moving coils or stationary coils; permanent magnet rotors or soft iron rotors or coil type rotors; those which operate from D.-C. for A.-C.; also, such other electrical and electronic indicators as may furnish an indication representative of the ratio or difference between currents, without regard to their magnitude.

While the invention has been described in detail with respect to certain particularly preferred examples, it will be understood by those skilled in the art that various changes and modifications may be made without departing from the spirit and scope of the invention, and it is intended therefore, to cover all such changes and modifications in the appended claims.

What is claimed is:

1. Apparatus for indicating the level of non-gaseous fluids in a container adapted for use from time to time in indicating the levels of different fluids, comprising an electric indicating instrument, at least two electric circuits for controlling the indication of said instrument, said circuits being adapted to be energized by a single source of alternating current, a condenser including spaced electrodes substantially vertically arranged in said container, so that said electrodes will be immersed in the fluid in said container to an extent dependent upon the level of the fluid therein, whereby the capacitance of said condenser will vary with the level of the fluid in said container, conductors connecting said condenser in one of said circuits, a comparison condenser including electrodes similarly connected in the other of said circuits and having its electrodes substantially completely immersed in a fluid which has substantially the same dielectric values as the fluid in the container throughout the range of ambient conditions to which the entire apparatus may be subjected during operation of the apparatus, said comparison condenser being positioned so as to be subject to the same ambient conditions as the first named condenser, said comparison condenser being adapted for change of its associated fluid to maintain the aforesaid relationship of the dielectric values whenever the first named condenser is to be used with a different fluid, and a variable reactance connected in each of said circuits to balance said circuits and to provide a zero, set-up adjustment for said indicating instrument.

2. Apparatus in accordance with claim 1, wherein said comparison condenser has its electrodes immersed in the same fluid, the level of which is being measured by said first named condenser.

3. Apparatus in accordance with claim 1, wherein said comparison condenser is located within the same container as the fluid, the level of which is being measured by said first named condenser, and is subjected to the same ambient conditions as said fluid.

4. Apparatus in accordance with claim 1, wherein said comparison condenser is located within the same container as the fluid, the level of which is being measured by said first named condenser, and wherein said comparison condenser has its electrodes immersed in said fluid, so as to be subject at all times to the same ambient conditions as said first named condenser.

5. Apparatus in accordance with claim 1, wherein said circuits are similar bridge circuits, and wherein the unbalance voltages of each of said bridge circuits respectively are connected to control the indication of said instrument.

6. Apparatus in accordance with claim 1, wherein each of said circuits comprises a bridge circuit, two arms of which are formed by a center-tapped secondary of a transformer, the primary of which is energized by said source of alterating current, there being two such center-tapped secondaries of said transformer for said circuits respectively, wherein said variable reactance in each of said circuits is connected in a third arm of each of said bridge circuits, and wherein said first named condenser and said comparison condenser are respectively connected in the fourth arm of each of said bridge circuits, the unbalance voltages of each of said bridge circuits being connected to control the indication of said instrument.

7. Apparatus in accordance with claim 1, wherein each of said circuits is a bridge circuit, the unbalance voltages of each of said circuits respectively being connected to control the indication of said instrument, wherein said unbalance voltages are supplied to said instrument respectively through rectifiers, and wherein said instrument is a direct current instrument having two deflecting coils energized through said rectifiers from said circuits respectively.

8. Apparatus in accordance with claim 1, wherein in each said circuit, said variable reactance is an inductance connected in parallel with the condenser in the respective circuits.

9. Apparatus in accordance with claim 1, wherein said two circuits are connected in parallel with said source of alternating current, each of said parallel circuits including said first named condenser and said comparison condenser respectively, wherein said variable reactance in each said circuit is an inductive reactance connected in parallel with the condenser in each of said circuits, a rectifier in each of said circuits connected in series with the condenser-reactance thereof across said source of alternating current, and wherein said indicating instrument is a direct current ratiometer-type instrument having two deflecting coils arranged to be operated by direct current and energized respectively by the rectified currents from each of said circuits.

10. In a system for measuring liquid levels by the measurement of capacitance changes resulting from changes in the liquid level, apparatus for reducing errors caused by variation in the dielectric constant of the liquid, comprising a measuring condenser having spaced plates immersed in the liquid, the level of which is to be measured to an extent dependent upon such level and arranged so that its capacitance is a function of the level and dielectric constant of said liquid, a compensating condenser having spaced plates immersed in a representative sample of said liquid and arranged to be subject to the same ambient conditions affecting capacitance, so that its capacitance is a function of the dielectric constant of said liquid and is independent of the level which is being measured, first circuit means including said measuring condenser and responsive to changes in the reactance thereof, second circuit means including said compensating condenser and responsive to changes in the reactance thereof, alternating current power supply means energizing said circuit means, and indicating means under the mutual control of said first and second circuit means.

11. In a system for measuring liquid levels by the measurement of capacitance changes resulting from changes in the liquid level, apparatus for reducing errors caused by variation in the dielectric constant of the liquid, comprising a measuring condenser having spaced plates extending into the liquid, the level of which is to be measured, to an extent dependent upon such level, so that its capacitance is a function of the level and the dielectric constant of said liquid, a compensating condenser having spaced plates at all times completely immersed in a representative sample of said liquid which is subject to the same ambient conditions affecting capacitance so that its capacitance is a function of the dielectric constant of said liquid and independent of the level which is being measured, first circuit means including said measuring condenser and responsive to changes in the reactance thereof, second circuit means including said compensating condenser and responsive to changes in the reactance thereof, alternating current power supply means energizing said circuit means, and comparison means under the mutual control of said first and second circuit means and responsive to the relative impedances of said first and second circuit means as a measure of the level of said liquid.

12. In a capacitance-type system for measuring liquid levels, apparatus for reducing the error caused by variations in the dielectric constant, comprising an indicator, a circuit for controlling the indication of said indicator, power supply means energizing said circuit, means for producing an electrical indicator-actuating force that is a function of the level and dielectric constant of the liquid, the level of which is being measured, comprising a first electrical branch forming part of said circuit and including a first condenser having spaced plates extending into said liquid and immersed therein to an extent dependent upon the level of the liquid, so that the capacitance of said condenser is a function of the level and the dielectric constant of the liquid, and means for modifying the value of said electrical indicator-actuating force in such direction as to reduce the effect thereon of varitaions in the dielectric constant of said liquid, comprising a second electrical branch forming part of said circuit and including a second condenser having spaced plates immersed in a representative sample of said liquid which is subject to the same ambient conditions affecting capacitance, so that its capacitance is a function of the dielectric constant of said liquid and independent of the level being measured.

13. Apparatus in accordance with claim 12, wherein said power supply means comprises a source of alternating voltage, and comprising in addition, a first inductance connected in said circuit to said first condenser and having a reactance at the frequency of said alternating voltage equal to the magnitude of the reactance of said first condenser when free of said liquid, and a second inductance connected in said circuit to said second condenser and having a reactance at the frequency of said alternating voltage equal to the magnitude of the reactance of said second condenser when free of said liquid.

14. Apparatus in accordance with claim 10, wherein said alternating current power supply means is a voltage source of constant frequency, and comprising in addition, a first inductance connected to said measuring condenser and having a reactance at the frequency of said alternating voltage equal to the magnitude of the reactance of said measuring condenser when free of said liquid, and a second inductance connected to said compensating condenser and having a reactance at the frequency of said alternating voltage equal to the magnitude of the reactance of said compensating condenser when free of said liquid.

15. Apparatus according to claim 10, in which said first circuit means comprises a first network including said measuring condenser and a first inductive element connected in parallel with said measuring condenser, in which said second circuit means comprises a second network including said compensating condenser and a second inductive element connected in parallel with said compensating condenser, and in which said indicating means comprises comparison means responsive to the relative impedances of said first and second networks as a measure of the amount of said liquid.

16. Apparatus according to claim 12, wherein said power supply means is a source of alternating current, and comprising in addition, a first inductive element connected in said first electrical branch in parallel with said first condenser and having a reactance value at the frequency of said alternating current equal to the magnitude of the reactance of said first condenser when free of said liquid, and a second inductive element connected in said second electrical branch in parallel with said second condenser and having a reactance value at the frequency of said alternating current equal to the magnitude of the reactance of said liquid; and wherein said circuit for controlling the indication of said indicator comprises comparison means responsive to the relative impedances of said first and said second electrical branches as a measure of the amount of said liquid.

ABRAHAM EDELMAN.

REFERENCES CITED

The following references are of record in the file of this patent:

UNITED STATES PATENTS

| Number | Name | Date |
|---|---|---|
| 1,212,438 | Bauder | Jan. 16, 1917 |
| 2,300,562 | Freystedt | Nov. 3, 1942 |
| 2,357,023 | Reid et al. | Aug. 29, 1944 |
| 2,377,275 | Smith | May 29, 1945 |

FOREIGN PATENTS

| Number | Country | Date |
|---|---|---|
| 441,576 | Great Britain | Jan. 22, 1936 |